United States Patent
Mizutani (10) Patent No.: US 10,229,822 B2
(45) Date of Patent: Mar. 12, 2019

(54) MASS SPECTROMETER WITH HIGH-VOLTAGE POWER SOURCE

(71) Applicant: SHIMADZU CORPORATION, Kyoto-shi, Kyoto (JP)

(72) Inventor: Shiro Mizutani, Uji (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/520,112

(22) PCT Filed: Oct. 20, 2014

(86) PCT No.: PCT/JP2014/077827
§ 371 (c)(1),
(2) Date: Apr. 19, 2017

(87) PCT Pub. No.: WO2016/063329
PCT Pub. Date: Apr. 28, 2016

(65) Prior Publication Data
US 2017/0323773 A1   Nov. 9, 2017

(51) Int. Cl.
*H01J 49/10*   (2006.01)
*H01J 49/06*   (2006.01)
(Continued)

(52) U.S. Cl.
CPC ............ *H01J 49/022* (2013.01); *H01J 3/40* (2013.01); *H01J 49/0036* (2013.01);
(Continued)

(58) Field of Classification Search
None
See application file for complete search history.

(56) References Cited

U.S. PATENT DOCUMENTS 6,002,600 A    12/1999   Scapellati
2008/0073513 A1    3/2008   Kikuma et al.
(Continued)

FOREIGN PATENT DOCUMENTS

EP   2 913 914 A1   9/2015
JP   4687716 B2   5/2011
(Continued)

OTHER PUBLICATIONS

Written Opinion for PCT/JP2014/077827 dated Dec. 16, 2014. [PCT/ISA/237].
(Continued)

*Primary Examiner* — Michael J Logie
(74) *Attorney, Agent, or Firm* — Sughrue Mion, PLLC (57) ABSTRACT

A high-voltage power source for applying high voltage to a nozzle of an ESI ion source includes a charge release assistant section including switch circuits and other elements for forcing electric charges accumulated at output terminals to be discharged in a polarity-switching operation, whereby the positive/negative switching of the polarity of the output voltage can be quickly performed. For example, when the voltage applied to the nozzle needs to be changed from $V_1$ to $V_2$ (where $V_1$ and $V_2$ are positive, and $V_1 > V_2$), a voltage control section operates a positive voltage generation section and negative voltage generation section so as to temporarily provide a negative output voltage. After a predetermined period of time, the voltage control section operates the positive voltage generation section and negative voltage generation section so as to provide voltage $V_2$.

12 Claims, 5 Drawing Sheets

(51) Int. Cl.
*H01J 49/02* (2006.01)
*H02M 7/10* (2006.01)
*H01J 49/00* (2006.01)
*H01J 3/40* (2006.01)
*H01J 49/42* (2006.01)
*H01J 49/16* (2006.01)

(52) U.S. Cl.
CPC ........ *H01J 49/0095* (2013.01); *H01J 49/063* (2013.01); *H01J 49/10* (2013.01); *H01J 49/165* (2013.01); *H01J 49/4245* (2013.01); *H02M 7/10* (2013.01); *H02M 7/103* (2013.01)

(56) References Cited

U.S. PATENT DOCUMENTS

| | | | |
|---|---|---|---|
| 2009/0230297 A1* | 9/2009 | Mizutani | H01J 49/022 250/281 |
| 2010/0116982 A1 | 5/2010 | Iwamoto et al. | |
| 2011/0101218 A1* | 5/2011 | Makarov | H01J 49/022 250/282 |
| 2015/0287580 A1* | 10/2015 | Mizutani | H02M 3/33507 250/292 |
| 2016/0118235 A1* | 4/2016 | Fujita | H01J 49/0031 250/290 |
| 2016/0172172 A1* | 6/2016 | Mizutani | H01J 49/022 250/294 |
| 2017/0287691 A1* | 10/2017 | Asano | H01J 49/42 |

FOREIGN PATENT DOCUMENTS

| | | |
|---|---|---|
| WO | 2007/029327 A1 | 3/2007 |
| WO | 2014/068780 A1 | 5/2014 |

OTHER PUBLICATIONS

Communication dated Oct. 20, 2017 from the European Patent Office in counterpart application No. 14904426.5.

Communication dated May 24, 2018 from the European Patent Office in counterpart European application No. 14904426.5.

* cited by examiner

| ORDER | COMPOUND NAME | ION m/z | ION POLARITY | NOZZLE VOLTAGE [kV] |
|---|---|---|---|---|
| 1 | A | xxx | + | +5 |
| 2 | B | yyy | + | +2 |
| 3 | C | zzz | + | +3 |

MASS SPECTROMETER WITH HIGH-VOLTAGE POWER SOURCE

CROSS REFERENCE TO RELATED APPLICATIONS

This application is a National Stage of International Application No. PCT/JP2014/077827, filed Oct. 20, 2014, the contents of which are incorporated herein by reference in its entirety.

TECHNICAL FIELD

The present invention relates to a mass spectrometer having a high-voltage power supply device for applying a high voltage to an ion source (or the like), and particularly, to a mass spectrometer having a polarity-switchable high-voltage power supply device for applying, to an ion source (or the like), a high voltage whose polarity depends on the polarity of an ion to be analyzed.

BACKGROUND ART

In a liquid chromatograph mass spectrometer (LC-MS) using a mass spectrometer as the detector for a liquid chromatograph (LC), an ion source which employs an atmospheric pressure ionization method, such as an electrospray ionization (ESI) or atmospheric pressure chemical ionization (APCI), is used in order to ionize a liquid sample eluted from a column of the LC while gasifying the same sample. For example, in an ESI ion source, a high voltage (e.g. ±several kV) having the same polarity as the ion to be analyzed needs to be applied to the tip of the nozzle from which the liquid sample is sprayed.

In such a mass spectrometer, when the detection of a positive ion and that of a negative ion are alternated with a short cycle of time, the polarity of the applied high voltage needs to be switched according to the polarity of the ion. For this operation, a high-voltage power supply device configured to be capable of switching the polarity of one system of output voltage is used. A conventionally and commonly known high-voltage power supply device for switching the high voltages having opposite polarities is one which uses a high-voltage-resistant reed relay (for example, see Patent Literature 1). However, the switching speed of the high-voltage power supply device using a high-voltage-resistant reed relay is slow since the switching of the polarity of the output voltage is achieved by the mechanical switching of a contact point.

To address this problem, the present inventor has proposed a high-voltage power supply device having a novel configuration as described in Patent Literature 2. This high-voltage power supply device has a positive voltage generation circuit and negative voltage generation circuit, each of which includes a DC-DC conversion circuit using an isolation transformer, with one resistor parallel-connected to the positive output terminals formed by the positive voltage generation circuit and another resistor parallel-connected to the negative output terminals formed by the negative voltage generation circuit, and the two resistors connected to each other in series. Using one end of the series-connected resistors as the reference end, a high positive or negative voltage is extracted from the other end.

In this high-voltage power supply device, the high voltage is generated in each of the positive and negative voltage generation circuits by supplying a predetermined drive signal from a control circuit to a switching element included in each of the positive and negative voltage generation circuits. When the high-voltage output is switched between the positive and negative polarities, the positive and negative voltage generation circuits are controlled so that the output voltage of one circuit changes from a high positive voltage +HV to zero while that of the other circuit simultaneously begins to change from zero to eventually converge to a high negative voltage −HV after overshooting this level. This intentional overshooting of the voltage which is being raised from zero is aimed at reducing the amount of time required for the positive/negative switching of the polarity.

In order to additionally increase the speed of the positive/negative switching of the polarity, the present inventor has further improved the high-voltage power supply device described in Patent Literature 2 and proposed a novel high-voltage power supply device in Patent Literature 3. In this high-voltage power supply device, the resistors respectively connected in parallel to the positive output terminals formed by the positive voltage generation circuit and the negative output terminals formed by the negative voltage generation circuit in the previously described device are replaced by switch circuits consisting of FETs or similar devices. A circuit consisting of two resistors connected in series is connected in parallel to each of the switch circuits. A signal extracted from the connection point of these two resistors on the positive side is sent as the on/off drive control signal to the negative-side switch circuit, while a signal extracted from the connection point of the two resistors on the negative side is conversely sent as the on/off drive control signal to the positive-side switch circuit.

In this high-voltage power supply device, for example, consider the situation where the positive voltage generation circuit is operated to make the high positive voltage +HV appear between its output terminals, while the negative voltage generation circuit is in effect inactive, with the voltage between its output terminals at approximately zero volts. In this situation, a voltage which equals the high voltage +HV divided by the ratio between the resistance values of the two resistors at the positive output terminals appears at the connection point of these two resistors and given to the switch circuit on the negative side. Consequently, this switch circuit turns on, and the conduction state is established between the output terminals of the negative voltage generation circuit. From this state, when the polarity of the voltage is switched from positive to negative, the positive voltage generation circuit is deactivated, while the negative voltage generation circuit is activated. When the voltage between the output terminals of the positive voltage generation circuit decreases to a predetermined level, the switch circuit on the negative side turns off. Meanwhile, the voltage between the output terminals of the negative voltage generation circuit increases, and this time, the switch circuit on the positive side turns on. Consequently, the electric charges remaining at the output terminals of the positive voltage generation circuit are rapidly discharged through the switch circuit, so that the output voltage of the positive voltage generation circuit rapidly decreases to zero.

In this manner, when the positive/negative switching of the polarity is performed, the two switch circuits respectively provided at the positive and negative output terminals function so as to induce the forced discharging of the electric charges remaining at the output terminals on the side corresponding to the polarity which is about to change to zero. This leads to a quick decrease in the voltage which is about to change to zero, so that the positive/negative switching of the polarity can be more quickly achieved.

For example, if the previously described high-voltage power supply device capable of the high-speed positive/negative switching of the polarity is used for an ESI ion source, it is possible to perform an LC/MS analysis while alternately switching a positive ion measurement mode and negative ion measurement mode with a short cycle of time. This is extremely useful, in particular, for a simultaneous multi-component analysis or similar analyses since both the compounds which easily turn into positive ions and the compounds which easily turn into negative ions can be exhaustively detected.

In recent years, an even greater improvement in the sensitivity of mass spectrometers has been demanded, in particular, for such purposes as the quantitative determination of trace amounts of components. Conventionally, it has not been a common practice to finely control the value itself of the voltage applied to the nozzle in an ESI ion source. However, it is commonly known that appropriately adjusting the voltage applied to the nozzle according to such factors as the properties of the target compound improves the ionization efficiency and provides a higher level of ion detection sensitivity than applying a fixed level of voltage. Accordingly, attempts have been made to improve the detection sensitivity for each individual compound by adjusting the voltage applied to the nozzle; for example, in the positive ion measurement mode, the voltage is adjusted within an approximate range of +2 kV to +5 kV according to the kind of compound, or for each ion designated as the SIM (selected ion monitoring) measurement target for each compound or each transition (combination of a precursor ion and product ion) designated as the MRM (multiple ion reaction monitoring) measurement target for each compound.

However, in an SIM or MRM measurement, it is normally necessary to change the ion or transition as the measurement target within a short period of time of a few milliseconds to several tens of milliseconds. Attempting to change the value of the voltage applied to the nozzle within such a short period of time causes the following problem.

Not only the aforementioned high-voltage power supply device but also any high-voltage power supply device of the same type normally has a capacitive load located at its output terminal to smooth the output voltage. In the phase of increasing the voltage value (absolute value of the voltage), the voltage rises at high speeds since the capacitive load can be quickly charged by increasing the output current. By comparison, in the phase of decreasing the voltage value (absolute value of the voltage), the electric charges accumulated in the capacitive load need to be discharged through a channel which includes output resistors and other elements. Therefore, the speed of decrease in the voltage is considerably lower than that of the increase in the voltage. For example, in one example of the high-voltage power supply device according to Patent Literature 3 manufactured by the present applicant, the process of increasing the voltage from +2 kV to +5 kV requires 1 to 5 msec, while the process of decreasing the voltage from +5 kV to +2 kV requires 10 to 50 msec, which is approximately ten times slower than in the voltage-increasing process.

For example, in such applications as a simultaneous multi-component analysis of agricultural chemicals residues, it is necessary to sequentially perform the measurement for ions originating from a plurality of target compounds using the technique of MRM measurement. If the process of changing the applied voltage requires a considerable amount of time as in the previously described case, it will be necessary to shorten the data acquisition time (or so-called "dwell time") or limit the number of MRM transitions to be concurrently subjected to the measurement. In the former case, the detection sensitivity will be sacrificed. In the latter case, fewer compounds can be simultaneously subjected to the measurement, and in some cases it may be necessary to perform the measurement multiple times for the same sample.

CITATION LIST

Patent Literature

Patent Literature 1: U.S. Pat. No. 6,002,600 B
Patent Literature 2: JP 4687716 B
Patent Literature 3: WO 2014/068780 A

SUMMARY OF INVENTION

Technical Problem

The present invention has been developed to solve the previously described problem. Its objective is to provide a mass spectrometer which requires a shorter settling time for the stabilization of the high voltage applied to the ion source or similar device when the voltage value of the voltage is changed without changing its polarity, and in particular, when the voltage value (absolute value) is changed in the decreasing direction, so that, for example, MRM or SIM measurements for a larger number of compounds can be performed within a specific cycle time.

Solution to Problem

As noted earlier, in the high-voltage power supply device described in Patent Literature 3, the high-speed positive/negative switching of the polarity is achieved by the forced discharging of the electric charges accumulated at the output terminals. As a result, the period of time required for switching the polarity is decreased to approximately 1 to 10 msec, which is comparable to the switching time required for increasing the voltage without changing its polarity. Paying attention to the fact that this polarity-switching time is considerably shorter than the switching time required for decreasing the voltage without changing its polarity, the present inventor has conceived the idea that the switching time for decreasing the voltage without changing its polarity can be reduced by adding an operation corresponding to the polarity switching operation which is actually unnecessary in the voltage-changing process intended for decreasing the voltage without changing its polarity.

That is to say, the present invention developed for solving the previously described problem is a mass spectrometer provided with a high-voltage power source for applying a high voltage to a specific section in order to perform an ionization and mass spectrometry of a component in a sample, the mass spectrometer characterized in that:

the high-voltage power source includes: a positive voltage generation section for generating a high positive voltage; a negative voltage generation section for generating a high negative voltage; a voltage control section for operating each of the positive and negative voltage generation sections so that a predetermined voltage is generated in each voltage generation section; and a charge release assistant section to which a pair of positive output terminals of the positive voltage generation section and a pair of negative output terminals of the negative voltage generation section are connected, where the charge release assistant section is configured as follows: in a switching operation between a positive voltage output and a negative voltage output under a command of the voltage control section, when the voltage between either the positive output terminals or the negative output terminals is equal to or higher than a predetermined level, the charge release assistant section reduces the impedance between the other pair of output terminals having an opposite polarity so as to release electric charges accumulated at these output terminals immediately before the impedance is reduced; and the mass spectrometer includes a controller for controlling the voltage control section as follows: when the output voltage supplied from the high-voltage power source is changed from $|V_1|$ to $|V_2|$ (where $|V_1|>|V_2|$) without changing the polarity of the output voltage, the positive voltage generation section and the negative voltage generation section are operated so as to temporarily switch the polarity of the output voltage for a predetermined period of time from the state where the positive voltage generation section and the negative voltage generation section are being operated so as to maintain the output voltage at $|V_1|$, and subsequently, the positive voltage generation section and the negative voltage generation section are operated so as to switch the polarity of the output voltage back to the polarity used before the temporary switching operation and settle the output voltage at $|V_2|$.

A typical example of the high-voltage power source in the mass spectrometer according to the present invention is the high-voltage power supply device described in Patent Literature 3.

That is to say, in the first mode of the mass spectrometer according to the present invention, the high-voltage power source is configured as follows:

one of the pair of output terminals of the positive voltage generation section is connected to one of the pair of output terminals of the negative voltage generation section to form a series connection of the two voltage generation sections, with one end of the series connection used as a reference end and the other end used for extracting a high-voltage output having a switched polarity; and the high-voltage power source includes the following elements as the charge release assistant section: a first impedance-variable section connected between the pair of output terminals of the positive voltage generation section; a second impedance-variable section connected between the pair of output terminals of the negative voltage generation section; a first output driver for driving the second impedance-variable section so as to change the impedance of this section based on the voltage or current appearing between the pair of output terminals of the positive voltage generation section; and a second output driver for driving the first impedance-variable section so as to change the impedance of this section based on the voltage or current appearing between the pair of output terminals of the negative voltage generation section.

The first and second impedance-variable sections each have an impedance whose value can be set at a plurality of different levels according to a drive control signal from the second and first output drivers, respectively. It is irrelevant how many possible levels the impedance has, or whether its change is continuous or discontinuous (discrete). Accordingly, the first and second impedance-variable section may be a switch circuit whose impedance has two possible levels, i.e. effective infinity and zero.

In the second mode of the mass spectrometer according to the present invention, the high-voltage power source is configured as follows:

one of the pair of output terminals of the positive voltage generation section is connected to one of the pair of output terminals of the negative voltage generation section to form a series connection of the two voltage generation sections, with one end of the series connection used as a reference end and the other end used for extracting a high-voltage output having a switched polarity; and the high-voltage power source includes the following elements as the charge release assistant section: a first current source, located between the pair of output terminals of the positive voltage generation section, for supplying a variable current from the high-voltage side to the low-voltage side, where the maximum amount of this current is limited to a predetermined value; a second current source, located between the pair of output terminals of the negative voltage generation section, for supplying a variable current from the high-voltage side to the low-voltage side, where the maximum amount of this current is limited to a predetermined value; a first output driver for driving the second current source to change the current supplied from this current source based on the voltage or current appearing between the pair of output terminals of the positive voltage generation section; and a second output driver for driving the first current source to change the current supplied from this current source based on the voltage or current appearing between the pair of output terminals of the negative voltage generation section.

In any of the first and second modes, for example, when the polarity of the voltage output is switched from positive to negative, a voltage is generated at the output terminals of the negative voltage generation section. This voltage activates the first impedance-variable section or first current source connected to the pair of output terminals of the positive voltage generation section, whereupon the electric charges accumulated at the output terminals on the positive side at which the voltage is decreasing toward zero are discharged through the first impedance-variable section or by the first current source. As a result, the positive voltage quickly falls to zero and a predetermined level of negative voltage appears at the output of the charge release assistant section. Similarly, when the polarity of the voltage output is switched from negative to positive, the negative voltage quickly falls to zero and a predetermined level of positive voltage appears at the output of the charge release assistant section.

In the mass spectrometer according to the present invention, when the voltage applied from the high-voltage power source to the ion source (or the like) is changed from $|V_1|$ to $|V_2|$ without changing its polarity, the controller controls the voltage control section so as to operate the positive and negative voltage generation sections so that the polarity of the voltage is temporarily switched from the state where the positive and negative voltage generation sections are being operated so as to maintain the output voltage at $|V_1|$. For example, if the polarity of the voltage is switched from positive to negative, the electric charges accumulated at the output terminals of the positive voltage generation section are discharged in the aforementioned manner through the charge release assistant section within a short period of time. As a result, the voltage between the output terminals of the positive voltage generation section rapidly decreases. Subsequently, at a timing which is coincident with or later than the point in time where the voltage decreases to a specific level lower than $|V_2|$, the positive and negative voltage generation sections are operated so as to switch the polarity of the voltage back to the previous polarity and settle the output voltage at $|V_2|$.

By such a control, the operation of decreasing the absolute value of the voltage without changing its polarity is replaced by the polarity-switching operation. The polarity-switching operation is dramatically faster than the operation of decreasing the absolute value of the voltage without changing its polarity. Therefore, for example, in the case of sequentially changing the high-voltage applied to an ion source (or the like) to a plurality of preset values and acquiring data every time the voltage is changed, the unwanted settling time for the voltage-changing process is reduced and a greater amount of time can be allotted to the acquisition of the data. Specifically, for example, in the case of repeating a cycle in which SIM or MRM measurements for ions originating from a plurality of target compounds are performed for every change in the voltage, the reduction in the settling time makes it possible to increase the cycle repetition frequency by shortening the period of time required for one cycle, improve the device sensitivity by increasing the dwell time for the acquisition of data, or increase the number of SIM or MRM measurements that can be performed within one cycle (i.e. the number of measurement target ions).

The mass spectrometer according to the present invention may be configured to be capable of switching the measurement mode between the positive ion measurement mode for performing a measurement of positive ions originating from a sample and the negative ion measurement mode for performing a measurement of negative ions originating from a sample, or it may be configured to be capable of performing only one of the positive and negative ion measurement modes. In the former case, the high-voltage power source selectively provides one of the high positive and negative voltages according to the switching of the measurement mode. In the latter case, a high voltage with either a positive or negative polarity generated by the high-voltage power source is used according to the polarity of the ion to be monitored in the measurement mode concerned.

A typical application of the mass spectrometer according to the present invention is a mass spectrometer having an ion source employing an electrospray ionization (ESI) method including a nozzle for spraying a sample solution into an atmospheric ambience while electrically charging the sample solution. In this case, the high voltage generated by the high-voltage power source can be applied to the nozzle of the ESI ion source.

In such a configuration, for example, the controller may be configured to control the voltage control section so as to change the polarity and value of the voltage applied to the nozzle, according to the kind of target compound in the sample solution or that of a measurement target ion originating from the target compound.

This configuration allows the voltage applied to the nozzle to be optimized for the ionization for each target compound or each measurement target ion originating from the target compound. Therefore, a satisfactory level of ionization efficiency can be achieved for any target compound or ion. Consequently, a greater amount of ions will be subjected to the mass spectrometry, so that the detection sensitivity will be improved.

Advantageous Effects of the Invention

With the mass spectrometer according to the present invention, it is possible to increase the speed of change in the high voltage applied to an ion source (or the like) in the process of changing this voltage so that its value is decreased without changing its polarity. This allows the voltage to be optimized for the ionization for each compound or each measurement target ion even in the case where MRM or SIM measurements for a large number of compounds need to be performed at high rates. Consequently, the detection sensitivity for each compound or ion will be improved.

DESCRIPTION OF EMBODIMENTS

A mass spectrometer as one embodiment of the present invention is hereinafter described with reference to the attached drawings.

Figure 1:
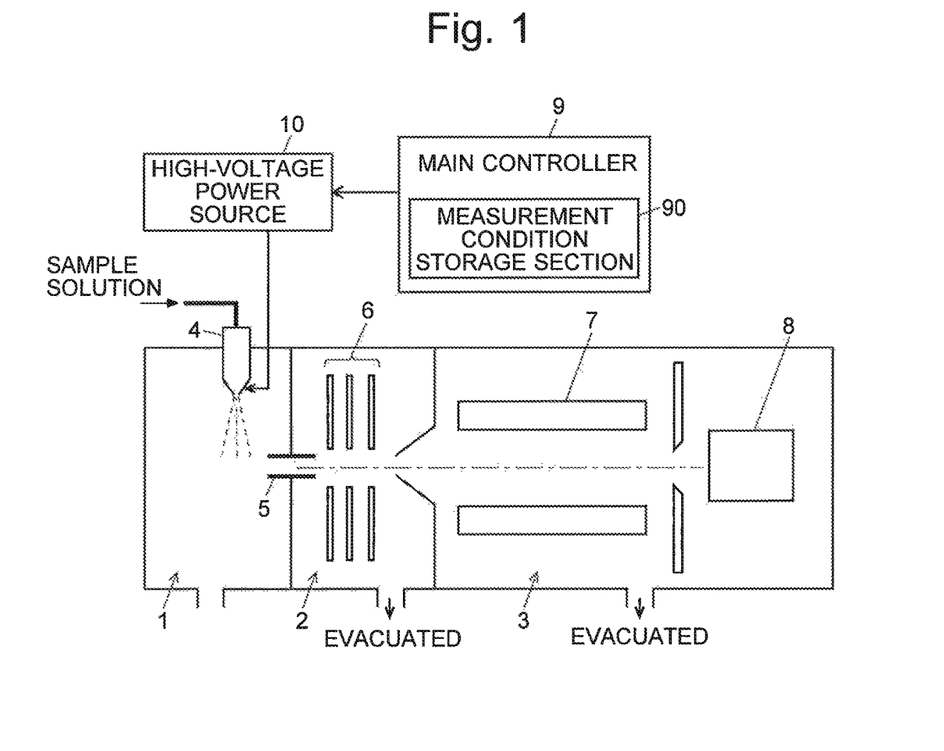
FIG. 1 is a schematic configuration diagram of a mass spectrometer as one embodiment of the present invention.

FIG. 1 is a schematic configuration diagram of the mass spectrometer of the present embodiment.

This mass spectrometer is an atmospheric pressure ionization mass spectrometer for analyzing a sample solution which, for example, is eluted from a column of a liquid chromatograph. The sample solution is sprayed from a nozzle 4 for electrospray ionization into an ionization chamber 1 maintained at substantially atmospheric pressure to ionize compounds contained in the sample solution. In this process, it is necessary to apply, to the tip of the nozzle 4, a high voltage whose polarity is changed according to the polarity of the ions to be generated, i.e. according to which of the positive and negative ion measurement modes is carried out. As the voltage source for this operation, a high-voltage power source 10 which is capable of switching the polarity of the output voltage at high speeds, as will be described later, is used.

The ions generated in the atmospheric ambience in the previously described manner are sent through a desolvation tube 5 into an intermediate vacuum chamber 2 located in the next stage, where the ions are converged by an ion lens 6 driven by a power source (not shown), and sent into a high vacuum chamber 3 maintained at a higher degree of vacuum. The ions are introduced into a space extending along the longitudinal axis of a quadrupole mass filter 7 placed within the high vacuum chamber 3. The quadrupole mass filter 7 is formed by four rod electrodes, to which a voltage composed of a radio-frequency voltage superposed on a DC voltage is applied from a voltage source (not shown). The electric field created by this voltage allows only an ion having a specific mass-to-charge ratio to pass through the quadrupole mass filter 7. The ion which has passed through the quadrupole mass filter 7 reaches an ion detector 8. The ion detector 8 produces an ion intensity signal corresponding to the number of ions which have reached the same detector. A main controller 9 performs analysis operations by controlling the high-voltage power source 10 and other power sources (not shown) as well as other devices according to the measurement conditions including various parameters stored in a measurement condition storage section 90.

Figure 2:
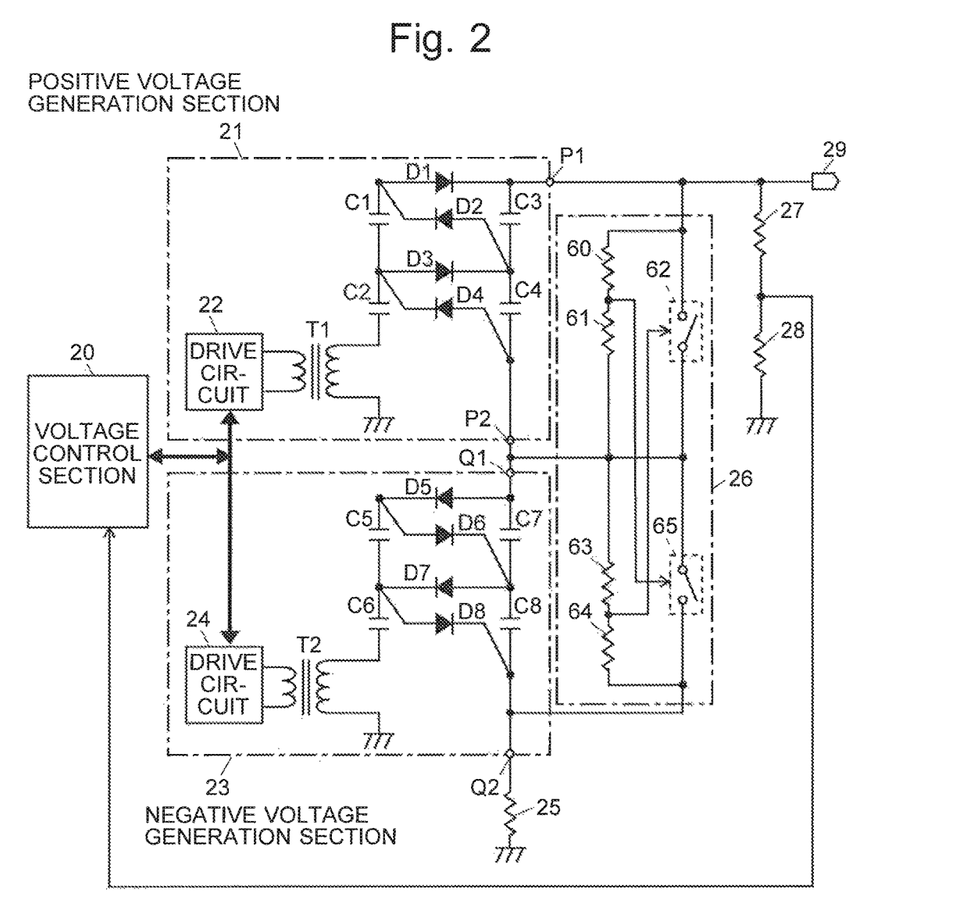
FIG. 2 is a configuration diagram showing one example of the high-voltage power source in the mass spectrometer of the present embodiment.
Figure 3:
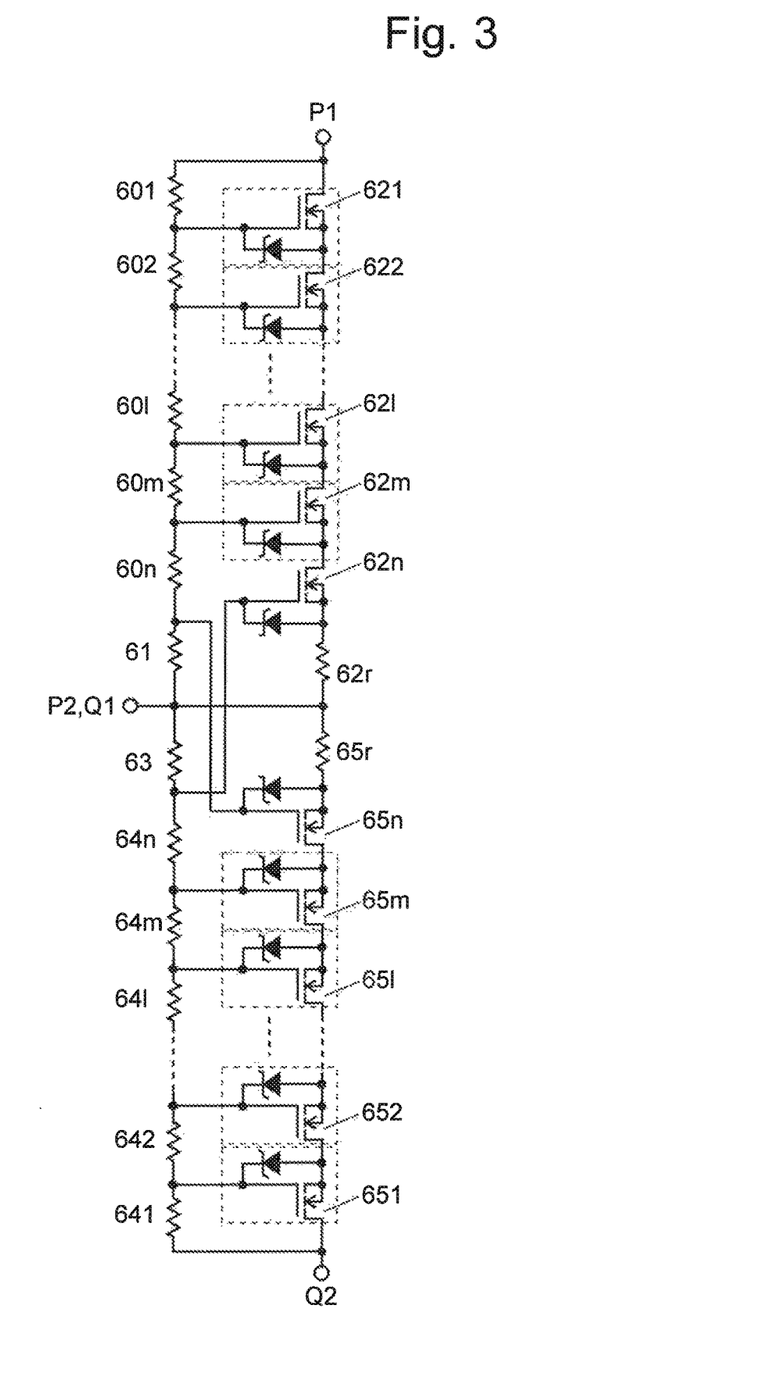
FIG. 3 is a diagram showing a configuration example of the charge release assistant section in FIG. 2.

FIG. 2 is a configuration diagram showing one example of the high-voltage power source 10, while FIG. 3 is a diagram showing a specific configuration example of the charge release assistant section 26 in FIG. 2. This high-voltage power source 10 is a high-voltage power supply device disclosed in Patent Literature 3.

As shown in FIG. 2, the high-voltage power source 10 includes a voltage control section 20, positive voltage generation section 21, negative voltage generation section 23, and charge release assistant section 26.

The positive voltage generation section 21 includes a boosting transformer T1, a drive circuit 22 for driving the primary winding of the transformer T1, and a rectifying circuit employing a Cockcroft-Walton circuit (composed of four capacitors C1-C4 and four diodes D1-D4) connected to the secondary winding of the transformer T1. The negative voltage generation section 23 has the same basic configuration as the positive voltage generation section 21 except for the diodes D5-D8 in the Cockcroft-Walton circuit which are oppositely directed to their counterparts in the positive voltage generation section 21.

The output terminal P2 of the positive voltage generation section 21 is connected with the output terminal Q1 of the negative voltage generation section 23. The other output terminal Q2 of the negative voltage generation section 23 is grounded via a resistor 25. The charge release assistant section 26 is connected to the output terminals P1 and P2 of the positive voltage generation section 21 as well as the output terminals Q1 and Q2 of the negative voltage generation section 23. In the charge release assistant section 26, a parallel circuit including a series-connection circuit of resistors 60 and 61 in parallel with a switch circuit 62 is connected between the output terminals P1 and P2 of the positive voltage generation section 21, while a parallel circuit including a series-connection circuit of resistors 63 and 64 in parallel with a switch circuit 65 is connected between the output terminals Q1 and Q2 of the negative voltage generation section 23. The signal extracted from the connection point of the resistors 60 and 61 on the positive side is sent to the switch circuit 65 on the negative side as the on/off drive control signal. Conversely, the signal extracted from the connection point of the resistors 63 and 64 is sent to the switch circuit 62 on the negative side as the on/off drive control signal.

The output terminal P1 of the positive voltage generation section 21 is connected to a voltage output terminal 29 from which a high voltage having a switched polarity is provided. Two resistors 27 and 28 are connected in series between this voltage output terminal 29 and the ground. The voltage signal at the connection point of the resistors 27 and 28 is fed back to the voltage control section 20. Although not shown, each of the drive circuits 22 and 24 in the positive and negative voltage generators 21 and 23 includes a DC voltage source and switching element connected in series to the primary winding of the transformer T1 or T2. The voltage applied (or electric current supplied) from the DC voltage source to the primary winding is turned on and off by the switching element. The pulse width of a rectangular wave signal for driving the switching element to turn on and off is controlled by the voltage control section 20, whereby the amount of effective power supplied to the primary winding of the transformer T1 or T2 changes. Along with this change, the output voltages of the positive and negative voltage generation sections 21 and 23 change from zero to their respective preset levels.

In this high-voltage power source 10, the operation of switching the polarity of the output voltage from positive to negative or vice versa is performed at high speeds. This operation of switching the polarity of the output voltage is hereinafter schematically described.

For example, consider the situation where the positive voltage generation section 21 is driven to make high positive voltage +HV appear between the output terminals P1 and P2, while the negative voltage generation section 23 is in effect inactive, with the voltage between its output terminals Q1 and Q2 at approximately zero volts. In this situation, a voltage which equals high voltage +HV divided by the ratio between the resistance values of the resistors 60 and 61 is generated at the connection point of these resistors 60 and 61. This voltage is given as the drive control signal to the switch circuit 65 on the opposite-polarity side. Consequently, this switch circuit 65 turns on, and the conduction state is established between the output terminals Q1 and Q2 of the negative voltage generation section 23.

From this state, when the polarity of the voltage is switched from positive to negative, the positive voltage generation section 21 is deactivated, while the negative voltage generation section 23 is activated. The voltage between the output terminals P1 and P2 of the positive voltage generation section 21 begins to decrease. When this voltage reaches a predetermined level, the switch circuit 65 turns off. Conversely, the voltage (in absolute value) between the output terminals Q1 and Q2 of the negative voltage generation section 23 increases. As a result, this time, the drive control signal is given to the switch circuit 62 and makes this switch circuit 62 turn on. Consequently, the electric charges remaining at the output terminal P1 of the positive voltage generation section 21 are rapidly discharged through the switch circuit 62 and quickly decreases to zero.

When the switch circuit 62 or 65 is in the ON state, the switch circuit 62 or 65 has an extremely low level of impedance and easily allows the passage of electric current. Conversely, when the switch circuit 62 or 65 is in the OFF state, the switch circuit 62 or 65 has an extremely high level of impedance and does not easily allow the passage of electric current. In other words, the switch circuits 62 and 65 are both an impedance-variable circuit whose impedance significantly changes depending on the voltage obtained by the resistive division using the resistors 60 and 61 or resistors 63 and 64.

The charge release assistant section 26 of FIG. 2 simply illustrates its principle. In a concrete case, a circuit including FETs, transistors or similar switching elements is used, as shown in FIG. 3. Normally, the withstand voltage between the drain and source terminals of a FET is approximately 1 kV. A single FET cannot withstand an output voltage which increases to a high level of approximately ±10 kV. Accordingly, in the example shown in FIG. 3, ten or more FETs are connected in series. Furthermore, in order to equalize the voltage applied between the drain and source terminals of those FETs 621-62$n$, the voltage between the output terminals P1 and P2 is divided by the series-connected resistors 601-60$n$ and 61, with the resulting voltages respectively applied to the gate terminals of the FETs 621-62$n$.

A resistor 62$r$ is connected between the source terminal of the FET 62$n$ located at the lowest-voltage end among the large number of series-connected FETs 621-62$n$ and the output terminal P2. This enables the FET 62$n$ (which is hereinafter called the "drive FET" to distinguish it from the other FETs) to control the electric current passing through the other FETs 621-62m. The gate terminal of the FET 62n is connected to the connection point of the resistors 64n and 63 on the negative side. In other words, a voltage obtained by the resistive division of the negative output voltage is applied to the gate terminal of the FET 62n on the positive side. The negative side also has a similar configuration. The Zener diode connected between the gate and source terminals of each FET has the function of preventing an overvoltage from being applied to the gate electrode.

Consider the situation where a high positive voltage is being provided at the output terminal. In this situation, since the output voltage of the negative voltage generation section 23 is zero, the voltage at the gate terminal of the drive FET 62n on the positive side is approximately zero. Meanwhile, the drive FET 65n on the negative side is supplied with a voltage obtained by the resistive division of the output voltage on the positive side. For example, if the voltage obtained by the resistive division is 10 V, the resistance value of the resistor 65r connected to the source terminal of the drive FET 65n is 1 kΩ, and the gate threshold (Vth) of the drive FET 65n is 4 V, an electric current with a maximum amount of (10V−4V)/1 kΩ=6 mA may possibly flow through the drive FET 65n and other FETs 651-65m connected in series. However, when a high positive voltage is being provided, almost no current actually flows through the drive FET 65n and other FETs 651-65m on the negative side, since the output voltage of the negative voltage generation section 23 (i.e. the voltage between output terminals Q1 and Q2) is approximately zero.

By comparison, in the situation where the voltage between the output terminals P1 and P2 of the positive voltage generation section 21 is rising after the output is switched to a high positive voltage from the state where a high negative voltage is being provided, there are electric charges accumulated at the output terminal of the negative voltage generation section 23, so that an electric current with a maximum amount of 6 mA flows through the drive FET 65n and other FETs 651-65m, whereby the accumulated electric charges are rapidly discharged.

As just described, in the high-voltage power source 10, electric charges remaining at the output terminals on the positive side are forced to be discharged through the charge release assistant section 26 when the polarity of the output voltage is switched from positive to negative, while electric charges remaining at the output terminals on the negative side are forced to be discharged when the polarity of the output voltage is oppositely switched from negative to positive. This has the advantage that the positive/negative switching of the polarity can be performed more quickly than in the conventional case.

The configuration of the charge release assistant section 26 is not limited to the one shown in FIG. 3; a modified configuration using transistors or similar elements is also possible, as described in Patent Literature 3. Additionally, in the circuit shown in FIG. 3, the series-connection circuit of the FETs inclusive of the drive FET 62n or 65n may also be considered to be a current source with the maximum current limited in the previously described manner. Accordingly, each of the series-connection circuits of the FETs including the drive FET 62n or 65n can also be regarded as a variable-current source.

Next, a characteristic operation carried out by the main controller 9 and high-voltage power source 10 in the mass spectrometer of the present embodiment is described.

Consider the case of a quantitative determination of a plurality of known kinds of target compounds which are contained (to be exact, which may possibly be contained) in a sample solution. In this case, SIM measurements aimed at the mass-to-charge ratios of specific ions originating from those target compounds are repeated within a predetermined measurement time range, and a mass chromatogram (extracted ion chromatogram) is created from the ion intensity signal obtained in each SIM measurement. On this mass spectrum, a peak which corresponds to the target compound is detected, the area of this peak is calculated, and the quantitative value is determined from the peak area value.

Figure 4:
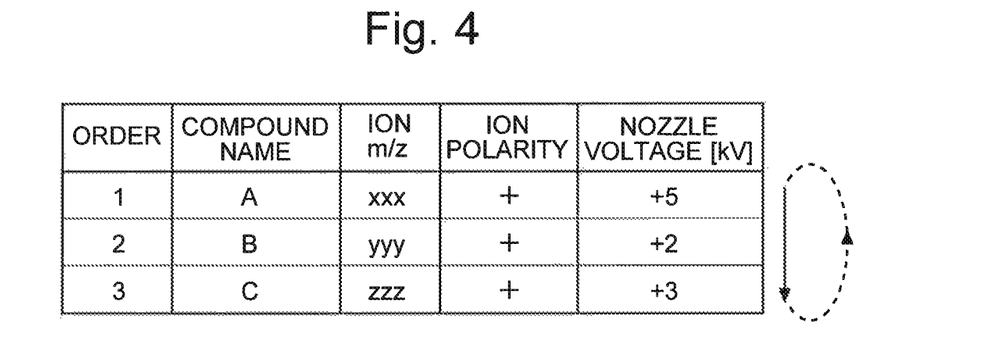
FIG. 4 shows one example of the correspondence between the compounds to be simultaneously subjected to a measurement and the nozzle voltage in the mass spectrometer of the present embodiment.

In ESI ion sources, the value of the application voltage which yields the highest level of ionization efficiency varies depending on the kind of compound. Therefore, when SIM measurements for a plurality of target compounds are performed in the previously described manner, each target compound can be detected with high sensitivity by appropriately changing the application voltage to the nozzle 4 depending on the kind of compound. Accordingly, for example, when SIM measurements for three target compounds are performed within a certain measurement time range, the optimum nozzle voltages for the target compounds are previously set as one of the measurement parameters, as shown in FIG. 4. Such a setting can be performed by analysis operators as needed. It is also possible to previously create a table (or the like) showing the relationship between the kind of compound and optimum nozzle value for a large number of compounds, in which case the system can be configured so that, when an analysis operator selects a target compound, the system refers to the aforementioned table (or the like) and automatically sets the optimum nozzle voltage for the selected target compound. In any case, a set of information as shown in FIG. 4 is stored in the measurement condition storage section 90 as one of the measurement conditions.

Figure 5:
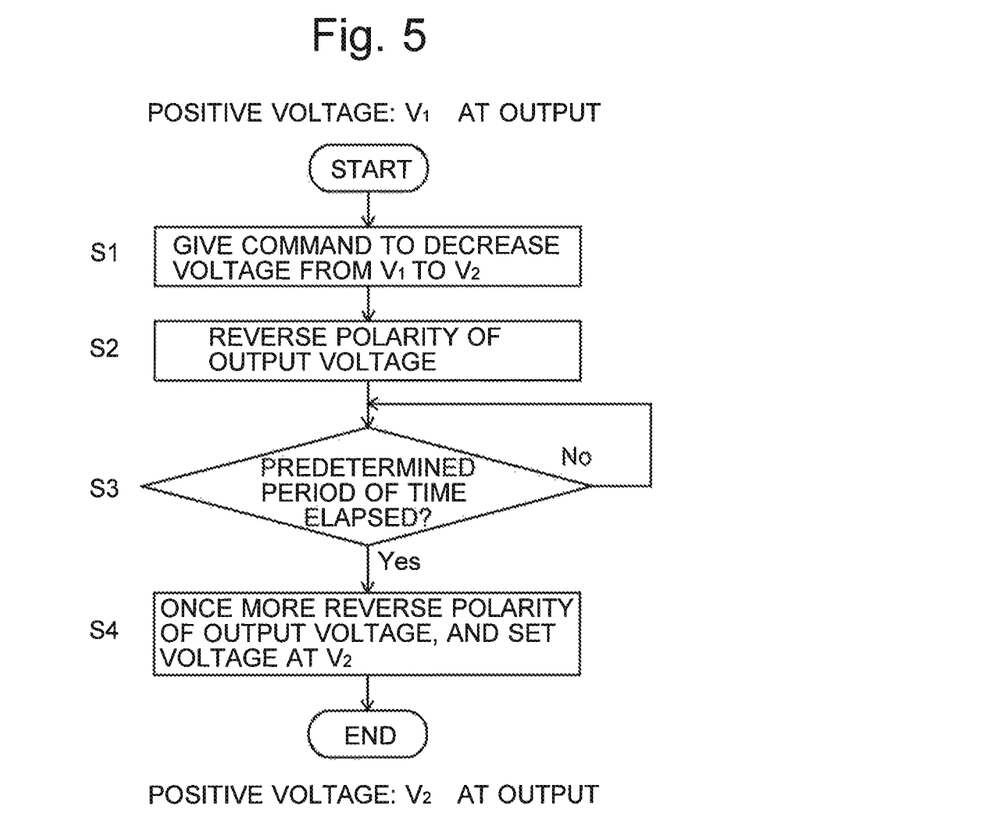
FIG. 5 is a flowchart showing the control procedure in the process of changing the voltage applied to the ion source in the mass spectrometer of the present embodiment.

When an analysis is initiated, the main controller 9 performs the analysis by controlling the high-voltage power source 10 and other power sources (not shown) as well as other devices according to the measurement conditions stored in the measurement condition storage section 90. Within the aforementioned measurement time range, the main controller 9 refers to the information shown in FIG. 4 (and other information sources) and controls relevant sections so that SIM measurements aimed at specific ions whose mass-to-charge ratios respectively correspond to the three compounds A, B and C are repeated with a predetermined cycle. In this process, the voltage applied to the nozzle 4 needs to be cyclically changed as follows: +5 kV→+2 kV→+3 kV→+5 kV→ . . . . In the high-voltage power source 10, this change is fast when the output voltage is changed so that the voltage (in absolute value) increases without changing its polarity, as in +2 kV→+3 kV→+5 kV. However, when the output voltage is changed so that the voltage (in absolute value) decreases without changing its polarity, as in +5 kV→+2 kV, the change is slow. Accordingly, when a command for changing the output voltage from $V_1$ to $V_2$ (where $V_1$ and $V_2$ are positive, and $V_1 > V_2$) is given from the main controller 9, the voltage controller 20 performs the voltage-changing operation by the procedure as shown in FIG. 5.

That is to say, in the situation where the output voltage of the high-voltage power source 10 is $V_1$, when a command for changing the output voltage from $V_1$ to $V_2$ is given (Step S1), the voltage control section 20 operates the positive and negative voltage generation sections 21 and 23 so as to initially reverse the polarity of the output voltage (Step S2).

The target voltage in this step may have any value whose polarity is negative, such as $-V_1$, $-V_2$ or other appropriate values. As noted earlier, when the positive/negative switching of the polarity is performed in the high-voltage power source 10, the electric charges accumulated at the output terminals are forced to be discharged by the automatic action of the charge release assistant section 26, i.e. without requiring any control signal or drive signal provided from external sections other than the charge release assistant section 26. Therefore, this polarity-switching operation is performed within a short period of time.

The voltage control section 20 maintains this state until a predetermined period of time passes from the polarity-switching control ("No" in Step S3). When the predetermined period of time has passed ("Yes" in Step S3), the voltage control section 20 changes the target voltage to $V_2$ and operates the positive and negative voltage generation sections 21 and 23 so as to once more reverse the polarity of the output voltage (Step S4). The predetermined period of time used in this process can be experimentally determined beforehand. As already explained, if the output voltage is changed so that the voltage decreases without changing its polarity, a considerable amount of time is required for the decrease in the voltage since the electric charges accumulated at the output terminals are merely discharged through the loading resistor (e.g. resistors 60 and 61 in FIG. 52). By comparison, if the temporary polarity-reversing operation is performed in the process of decreasing the voltage without changing its polarity, the electric charges accumulated at the output terminals are forced to be discharged by the charge release assistant section 26, whereby the period of time required for the voltage-changing operation is reduced.

Figure 6A:
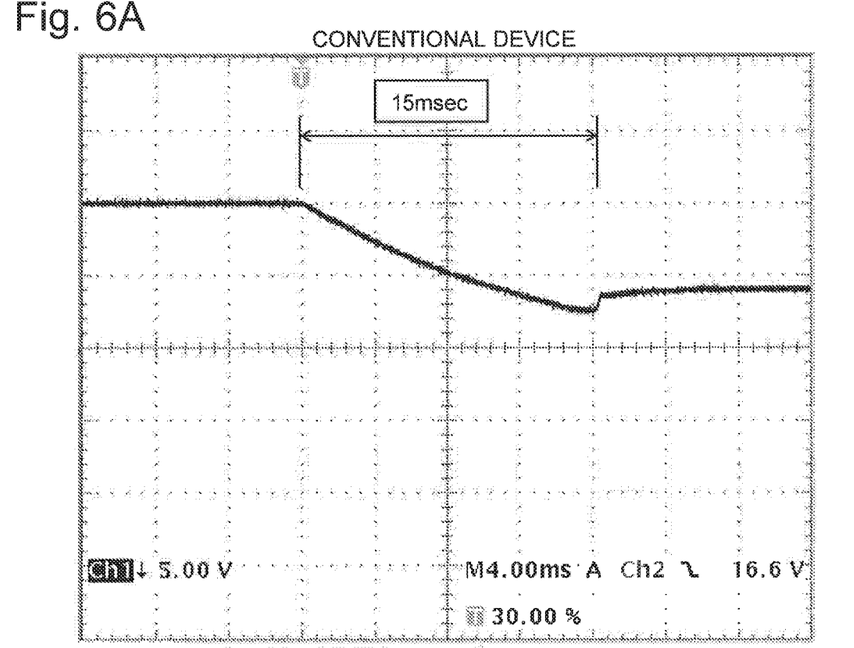
FIGS. 6A and 6B show actually measured voltage waveforms observed when the high voltage was changed in the high-voltage power source in the mass spectrometer of the present embodiment as well as in a conventional high-voltage power source.
Figure 6B:
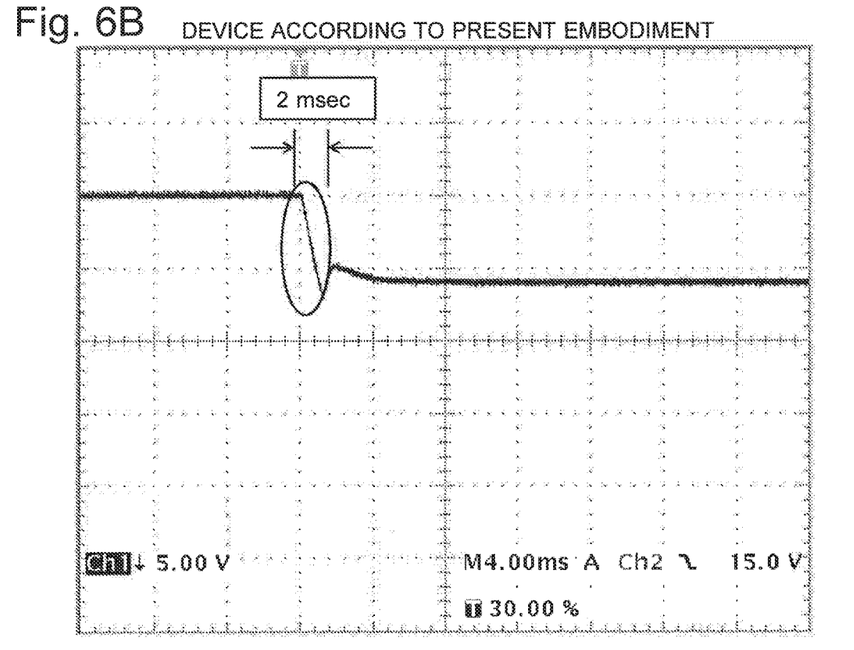

FIG. 6A is an actually measured waveform of the voltage change in the process of changing the voltage from +5 kV to +2 kV in a conventional device. This voltage-changing operation required approximately 15 msec. By comparison, FIG. 6B is an actually measured waveform of the voltage change in the process of changing the voltage from +5 kV to +2 kV in the device of the present embodiment. Due to the rapid decrease in the output voltage induced by the polarity-reversing operation, the total length of time for the voltage-changing operation was shortened to approximately 2 msec. It should be noted that the predetermined period of time used in Step S3 in the present example is tuned to an almost optimum value so that the voltage decreasing from +5 kV after the reversal of the polarity will revert to the previous polarity before the voltage becomes negative. However, such a strict tuning of the predetermined period of time is not always necessary. For example, a slight increase in the predetermined period of time which causes the voltage decreasing from the +5 kV to be temporarily negative is allowable if the total amount of time for the voltage-changing operation is sufficiently shorter than in the case where the polarity-reversing operation is not performed.

The previous example is concerned with the case of decreasing a positive voltage without changing its polarity. The idea of increasing the speed of the voltage-changing operation by the temporary polarity-reversing control is also evidently applicable in the case of decreasing the absolute value of a negative voltage without changing its polarity, e.g. when the voltage is changed from −5 kV to −2 kV.

The previous embodiment is concerned with the present invention applied in a single-type quadrupole mass spectrometer. The present invention is also applicable in a tandem quadrupole mass spectrometer including two quadrupole mass filters placed before and after a collision cell. In general, tandem quadruple mass spectrometers are commonly used for simultaneous multi-component analysis due to their high level of ion-selection capability. If there are a large number of compounds to be simultaneously analyzed, only a short period of MRM measurement time is available for one transition, and the operation of changing the output voltage from the high-voltage power source also needs to be performed at high speeds. Accordingly, the present invention is extremely useful in the case of performing MRM measurements in a tandem quadrupole mass spectrometer.

In the previous embodiment, the voltage generated by the high-voltage power source is applied to the nozzle of the ESI ion source. The present invention is also applicable in a mass spectrometer using a different type of ion source which requires an application of a high voltage. The present invention may also be applied in a section other than the ion source, such as an ion detector, which similarly needs an application of a high voltage generated by a high-voltage power source.

The mass spectrometer of the previous embodiment can selectively perform one of the positive and negative ion measurements by switching the polarity of the high voltage applied to the nozzle 4 of the ESI ion source. However, it is evident that the present invention is also applicable in a mass spectrometer capable of only one of the positive and negative ion measurements. In this case, although there is no need to switch the polarity of the high voltage applied to the nozzle 4, it is useful to provide, as in the previous embodiment, a high-voltage power source which is actually capable of the high-speed positive/negative switching of the polarity of the output voltage, and utilize its polarity-switching function to increase the speed of the operation of changing the voltage with the same polarity.

It should also be understood that the previous embodiment is a mere example of the present invention, and any change, addition or modification appropriately made within the spirit of the present invention in other aspects than those already described will naturally fall within the scope of claims of the present application.

REFERENCE SIGNS LIST

1 . . . Ionization Chamber
2 . . . Intermediate Vacuum Chamber
3 . . . High Vacuum Chamber
4 . . . Nozzle
5 . . . Desolvation Tube
6 . . . Ion Lens
7 . . . Quadrupole Mass Filter
8 . . . Ion Detector
9 . . . Main Controller
90 . . . Measurement Condition Storage Section
10 . . . High-Voltage Power Source
20 . . . Voltage Control Section
21 . . . Positive Voltage Generation Section
22, 24 . . . Drive Circuit
23 . . . Negative Voltage Generation Section
25, 27 . . . Resistor
26 . . . Charge Release Assistant Section
29 . . . Voltage Output Terminal
P1, P2, Q1, Q2 . . . Output Terminal
C1, C2, C3, C4, C5, C6, C7, C8 . . . Capacitor
D1, D2, D3, D4, D5, D6, D7, D8 . . . Diode
T1, T2 . . . Transformer
28, 60, 61, 63, 64, 601-60$n$, 62$r$, 65$r$ . . . Resistor
62, 65 . . . Switch Circuit
621-62$n$, 651-65$n$ . . . FET

The invention claimed is:

1. A mass spectrometer provided with a high-voltage power source for applying a high voltage in order to perform an ionization and mass spectrometry of a component in a sample, the mass spectrometer characterized in that:
the high-voltage power source comprises: a positive voltage generator that generates a high positive voltage;
a negative voltage generator that generates a high negative voltage;
a voltage controller that operates each of the positive and negative voltage generators so that a predetermined voltage is generated in each voltage generator; and
a charge release assistant circuit to which a pair of positive output terminals of the positive voltage generator and a pair of negative output terminals of the negative voltage generator are connected, where the charge release assistant circuit is configured as follows:
in a switching operation between a positive voltage output and a negative voltage output under a command of the voltage controller, when the voltage between either the positive output terminals or the negative output terminals is equal to or higher than a predetermined level, the charge release assistant circuit reduces an impedance between the other pair of output terminals having an opposite polarity so as to release electric charges at these output terminals, where the electric charges are accumulated immediately before the impedance is reduced; and
the mass spectrometer comprises a main controller for controlling the voltage controller as follows;
when an output voltage supplied from the high-voltage power source is changed from $V_1$ to $V_2$ where $V_1$ and $V_2$ have a same polarity and $|V_1|$ is larger than $|V_2|$, the positive voltage generator and the negative voltage generator are operated so as to temporarily switch a target voltage to another voltage having a polarity opposite to $V_1$ and $V_2$ for a predetermined period of time from a state where the positive voltage generator and the negative voltage generator are being operated so as to maintain the output voltage at $|V_1|$, and subsequently, the positive voltage generator and the negative voltage generator are operated so as to switch the polarity of the output voltage back to the polarity used before the temporary switching operation and settle the output voltage at $|V_2|$.

2. The mass spectrometer according to claim 1, wherein the high-voltage power source is configured as follows:
one of the pair of output terminals of the positive voltage generator is connected to one of the pair of output terminals of the negative voltage generator to form a series connection of the two voltage generators, with one end of the series connection used as a reference end and the other end used for extracting a high-voltage output having a switched polarity; and
the high-voltage power source comprises following elements as the charge release assistant circuit: a first impedance-variable section connected between the pair of output terminals of the positive voltage generator; a second impedance-variable section connected between the pair of output terminals of the negative voltage generator; a first output driver for driving the second impedance-variable section so as to change an impedance of this section based on the voltage or current appearing between the pair of output terminals of the positive voltage generator; and a second output driver for driving the first impedance-variable section so as to change an impedance of this section based on the voltage or current appearing between the pair of output terminals of the negative voltage generator.

3. The mass spectrometer according to claim 2, wherein:
the mass spectrometer is capable of switching a measurement mode between a positive ion measurement mode for performing a measurement of positive ions originating from a sample and a negative ion measurement mode for performing a measurement of negative ions originating from a sample, and the high-voltage power source selectively provides one of the high positive and negative voltages according to the switching of the measurement mode.

4. The mass spectrometer according to claim 3, wherein:
the mass spectrometer further comprises an ion source employing an electrospray ionization method including a nozzle for spraying a sample solution into an atmospheric ambience while electrically charging the sample solution, and applies the high voltage generated by the high-voltage power source to the nozzle.

5. The mass spectrometer according to claim 2, wherein:
the mass spectrometer further comprises an ion source employing an electrospray ionization method including a nozzle for spraying a sample solution into an atmospheric ambience while electrically charging the sample solution, and applies the high voltage generated by the high-voltage power source to the nozzle.

6. The mass spectrometer according to claim 1, wherein the high-voltage power source is configured as follows:
one of the pair of output terminals of the positive voltage generator is connected to one of the pair of output terminals of the negative voltage generator to form a series connection of the two voltage generators, with one end of the series connection used as a reference end and the other end used for extracting a high-voltage output having a switched polarity; and
the high-voltage power source comprises following elements as the charge release assistant circuit: a first current source, located between the pair of output terminals of the positive voltage generator, for supplying a variable current from a high-voltage side to a low-voltage side, where a maximum amount of this current is limited to a predetermined value; a second current source, located between the pair of output terminals of the negative voltage generator, for supplying a variable current from a high-voltage side to a low-voltage side, where a maximum amount of this current is limited to a predetermined value; a first output driver for driving the second current source to change the current supplied from this current source based on the voltage or current appearing between the pair of output terminals of the positive voltage generator; and a second output driver for driving the first current source to change the current supplied from this current source based on the voltage or current appearing between the pair of output terminals of the negative voltage generator.

7. The mass spectrometer according to claim 6, wherein:
the mass spectrometer is capable of switching a measurement mode between a positive ion measurement mode for performing a measurement of positive ions originating from a sample and a negative ion measurement mode for performing a measurement of negative ions originating from a sample, and the high-voltage power source selectively provides one of the high positive and negative voltages according to the switching of the measurement mode.

8. The mass spectrometer according to claim 7, wherein:
the mass spectrometer further comprises an ion source employing an electrospray ionization method including a nozzle for spraying a sample solution into an atmospheric ambience while electrically charging the sample solution, and applies the high voltage generated by the high-voltage power source to the nozzle.

9. The mass spectrometer according to claim 6, wherein:
the mass spectrometer further comprises an ion source employing an electrospray ionization method including a nozzle for spraying a sample solution into an atmospheric ambience while electrically charging the sample solution, and applies the high voltage generated by the high-voltage power source to the nozzle.

10. The mass spectrometer according to claim 1, wherein:
the mass spectrometer is capable of switching a measurement mode between a positive ion measurement mode for performing a measurement of positive ions originating from a sample and a negative ion measurement mode for performing a measurement of negative ions originating from a sample, and the high-voltage power source selectively provides one of the high positive and negative voltages according to the switching of the measurement mode.

11. The mass spectrometer according to claim 10, wherein:
the mass spectrometer further comprises an ion source employing an electrospray ionization method including a nozzle for spraying a sample solution into an atmospheric ambience while electrically charging the sample solution, and applies the high voltage generated by the high-voltage power source to the nozzle.

12. The mass spectrometer according to claim 1, wherein:
the mass spectrometer further comprises an ion source employing an electrospray ionization method including a nozzle for spraying a sample solution into an atmospheric ambience while electrically charging the sample solution, and applies the high voltage generated by the high-voltage power source to the nozzle.

* * * * *